US005754865A

United States Patent [19]

Itskin et al.

[11] Patent Number: 5,754,865
[45] Date of Patent: May 19, 1998

[54] LOGICAL ADDRESS BUS ARCHITECTURE FOR MULTIPLE PROCESSOR SYSTEMS

[75] Inventors: Randall Clay Itskin, Austin; John Carmine Pescatore, Jr., Georgetown; David Brian Ruth, Austin, all of Tex.

[73] Assignee: International Business Machines Corporation, Armonk, N.Y.

[21] Appl. No.: 573,683

[22] Filed: Dec. 18, 1995

[51] Int. Cl.⁶ .............................. G06F 9/46; G06F 13/14
[52] U.S. Cl. .................... 395/729; 395/728; 395/731; 395/293; 395/200.57; 395/200.58; 395/200.67; 395/200.79
[58] Field of Search ............................. 395/728, 729, 395/730, 731, 293, 295, 299, 302, 200.06, 200.12, 200.02, 856, 863, 182.06, 182.07, 182.08, 200.53, 200.55, 200.58, 200.6, 200.67, 200.75, 290, 800

[56] References Cited

U.S. PATENT DOCUMENTS

| | | |
|---|---|---|
| 4,130,864 | 12/1978 | Schlotterer . |
| 4,253,146 | 2/1981 | Bellamy et al. . |
| 4,449,183 | 5/1984 | Flahive et al. . |
| 4,896,256 | 1/1990 | Roberts ............................... 395/308 |
| 5,191,649 | 3/1993 | Cadambi et al. . |
| 5,235,684 | 8/1993 | Becker et al. ...................... 395/293 |
| 5,237,567 | 8/1993 | Nay et al. ........................... 395/293 |
| 5,261,109 | 11/1993 | Cadambi et al. . |
| 5,282,272 | 1/1994 | Guy et al. . |
| 5,388,247 | 2/1995 | Goodwin et al. . |
| 5,471,588 | 11/1995 | Nimishakavi et al. ............. 395/293 |
| 5,526,495 | 6/1996 | Shibata et al. ...................... 395/307 |
| 5,528,766 | 6/1996 | Ziegler et al. ...................... 395/293 |
| 5,555,425 | 9/1996 | Zeller et al. ........................ 395/800 |
| 5,555,430 | 9/1996 | Gephardt et al. ................... 395/800 |
| 5,606,659 | 2/1997 | Maloy ............................. 395/183.01 |

FOREIGN PATENT DOCUMENTS 464708  1/1992  European Pat. Off. .

Primary Examiner—Ayaz R. Sheikh
Assistant Examiner—Raymond N. Phan
Attorney, Agent, or Firm—Casimer K. Salys

[57] ABSTRACT

A logical bus architecture implements by active devices the functions performed by a physical address/command bus in the context of a multiple processing unit computer system. The logical bus eliminates the electrical loading, and associated frequency limitations, characterizing physical address/command buses as the number of system resources, processing units, connected to the bus increase. Address/command buses from the processing units are individually or in groups connected to ports of an address rebroadcast device. The device also receives bus master information from the computer system arbiter. Since the arbiter information is available before the actual transmission of signals over the address/command buses of the various processing units, bidirectional signal paths in the address rebroadcast device are selectively configured to match the master-slave signal flow between processing units as defined by the arbiter. Address/command signals are received from the master processing unit at one port and appropriately rebroadcast through the other ports to the other processing units with no more than gate propagation delays. Reconfiguration of the port directions in the address rebroadcast device is accomplished with each designation of a new bus master by the arbiter. Not only does the address rebroadcast device eliminate bus loading, but it also facilitates the selective isolation of processing units by port for fault testing and the like.

12 Claims, 3 Drawing Sheets

LOGICAL ADDRESS BUS ARCHITECTURE FOR MULTIPLE PROCESSOR SYSTEMS

FIELD OF THE INVENTION

The present invention generally relates to computer systems. More particularly, the invention is directed to a bus architecture for interconnecting multiple processing units in a computer system.

BACKGROUND OF THE INVENTION

Computer systems which utilize multiples of resources conventionally interconnect the resources to allow each resource appropriate access to the remaining resources. Increasing the number of processing unit resources in pursuit of greater system performance must be done carefully, recognizing that design tradeoffs occur as the number of physical resources increase. Therefore, though additional processing units may appear by parallel operation to improve the system performance, physical phenomenon such as electrical loading will rapidly constrain the improvement. This is true regardless of whether the system resource is a processing unit, a memory element, or an I/O subsystem.

With the advent of high performance and low cost integrated circuit microprocessors significant interest has developed in paralleling numerous processing units to improve the overall system performance. In the real world, however, each additional parallel connected processing unit adds capacitance load to the existing electrical interconnection, namely the system bus. As the capacitance increases, the maximum signal frequency capability of the bus decreases. Therefore, at some cross-over point this decreasing frequency as effects all the processors on the bus exceeds the benefits obtained by adding an additional processor to the bus. Stated otherwise, increasing the number of parallel processing units or other resources connected to a system bus will eventually lead to a relative decrease in the overall system performance.

The phenomenon described above is particularly pronounced in symmetrical multi-processor (SMP) systems which utilize a shared address/command (hereinafter generally referred to as address) bus. In such an architecture, the address bus is common to the processing units, the memory controller and the I/O subsystem. The need for a common address bus is dictated to a large extent by the fact that substantially all advanced processing units incorporate on-board cache, and as such must snoop a common address bus to maintain cache coherence. Since the address bus is common to so many of the system resources, experience has shown that address bus is the most likely to encounter the loading which bounds the system's clock frequency. Though cache coherence techniques other than snooping have been implemented, their success is somewhat limited. Examples of such techniques include directory based memory systems or all cache memories. In addition, the technique of maintaining coherence on an isolated bus has also been applied. Unfortunately, all such techniques tend to require extensive additional hardware and system complexity.

Shared bus multiple processor systems also have proven to be difficult to fault isolate when failure conditions are detected. In part, this is attributable to the complexity of isolating failed units when all the units are connected to the same bus. Present fault isolation practices often require the service person to remove and individually test each replaceable component connected to the bus, or to replace all the components at one time. Given the high cost and user demand of multiple processor systems, the latter practices tends to be the norm.

In view of the above, there exists a need for a bus architecture which permits the addition of processing units or other system resources with minimum loading effect, and which facilitates the selective isolation of field replaceable units during repair testing.

SUMMARY OF THE INVENTION

The present invention solves the problems of the prior art by providing a logical bus architecture which is comprised of multiple processing units each having multiple address lines, arbitration means for identifying a master processing unit from the multiple processing units, and address rebroadcast means connected to the address lines of the multiple processing units to selectively receive and rebroadcast an address, the selection of rebroadcast address being responsive to the arbitration means identification of the master processing unit.

In another form, the invention relates to an address rebroadcast apparatus for interconnecting multiple processing units which is comprised of multiple bidirectional ports for connection to address lines of multiple processing units, means for receiving data identifying a master of the multiple processing units, and means for interconnecting the bidirectional ports to have the address lines of the multiple processing units receive an address from address lines of the identified master processing unit and rebroadcast the received address to address lines of the other processing units.

The invention may also be practiced in a system having multiple data processing units, where the practice involves a method of operating a logical bus to communicate addresses between the multiple data processing units in the steps of receiving as an input to the logical bus arbitration data identified one of the multiple processing units as a master processing unit, establishing in a port of the logical bus connected to the identified master processing unit a mode of operation to receive an address from the identified master processing unit, establishing in ports of the logical bus connected to other processing units a mode of operation to selectively rebroadcast the address from the identified master processing unit, and receiving an address from the identified master processing unit at the corresponding logical port and rebroadcasting the address through ports of the logical bus connected to the other processing units.

According to one particular practice of the invention, the address buses of multiple processing units, the memory controller, and the I/O subsystems are connected to the ports of an electrically active address rebroadcast chip. Electrical loading of a shared address bus is avoided by routing address signals through the address rebroadcast chip receivers, multiplexers, and drivers. The selection and directionality of the ports is based upon the designation of a master processing unit as derived in an arbiter. The arbiter determines the bus master in normal manner, and transmits that information not only to the processing units, memory controller and I/O subsystems connected to the bus, but also to the address rebroadcast chip. Thereby, when address signals are generated on the address bus of the designated bus master, the logical bus is already configured to receive the address information through the port corresponding to the bus master and to transmit that information from the remaining ports. In this way, the address rebroadcast chip of the logical bus appears to each attached system resource as if it is a common physical bus, while obviating the electrical load, with minimum signal delay, and with no loss of clock cycles. Furthermore, the receiver/driver devices in the address rebroadcast chip are available to selectively disable ports during fault isolation.

These and other features of the invention will be more clearly understood and appreciated upon considering the detailed embodiment which follows hereinafter.

DESCRIPTION OF THE PREFERRED EMBODIMENT

Figure 1:
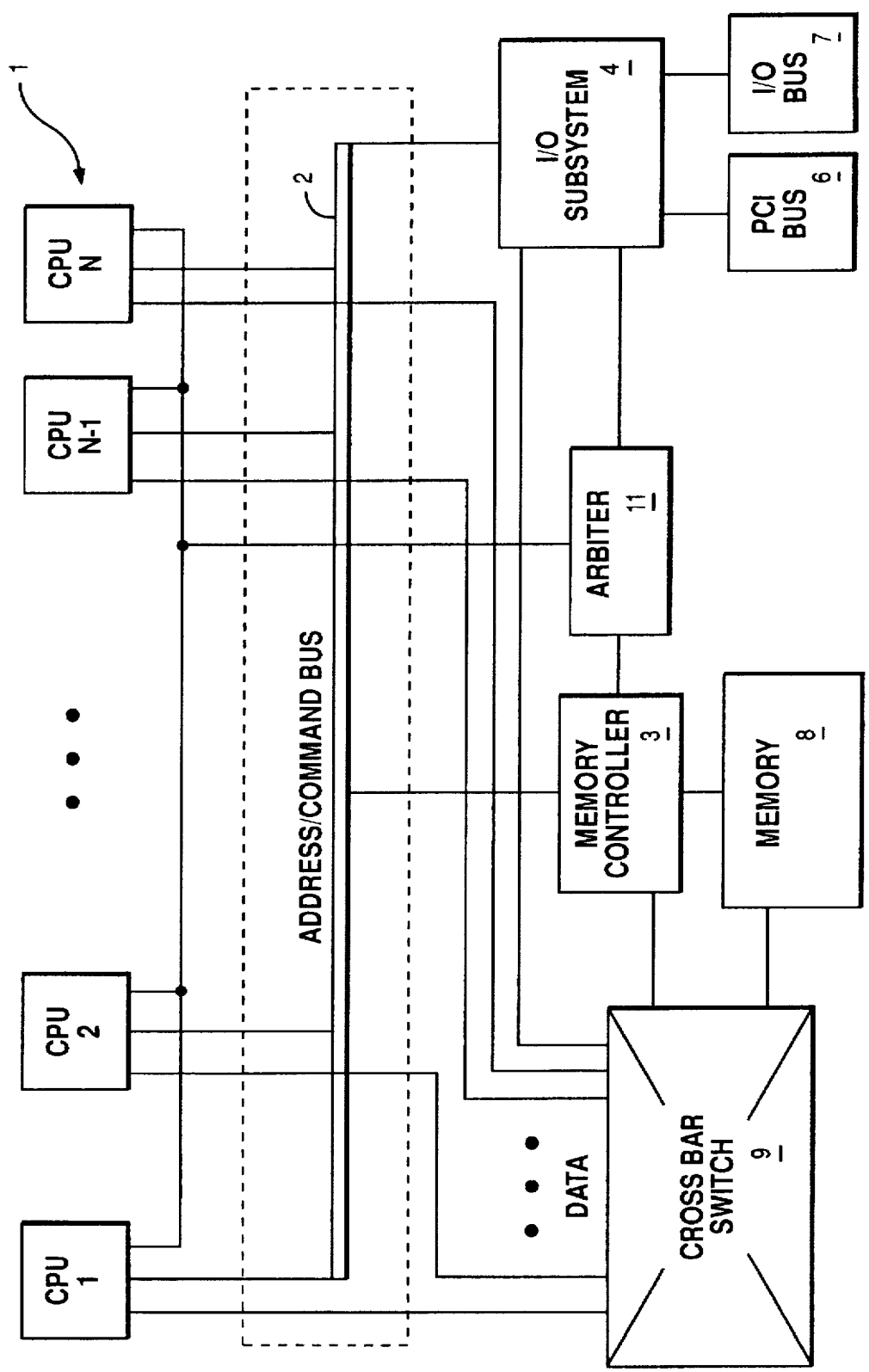
FIG. 1 is a schematic block diagram of a generalized multiple processor computer system using a data crossbar switch.

FIG. 1 illustrates by schematic block diagram a computer system of the type to which the invention pertains. As shown, a multiplicity of processing units (CPUs), shown generally at 1, have their respective address/command lines commonly connected to address/command bus 2 of the computer system. Memory controller 3 is also connected to address/command bus 2, as is I/O subsystem 4 with related PCI bus 6 and I/O bus 7. As embodied in FIG. 1, the computer system main memory 8 is connected to memory controller 3 and through cross-bar switch 9 to the respective data buses of multiple processing units 1. Arbiter 11 communicates with memory controller 3, the succession of processing units 1 and I/O system 4 in the course of selecting and designating a bus master for each clock cycle.

CPUs 1 are not unique in having processing capability. Advanced computer systems have intelligent processing units in memory controller 3 as well as in I/O subsystem 4. The processing units in the system of FIG. 1, and particularly those in CPUs 1, are likely to have associated high speed cache memory. In this context bus snooping to maintain cache coherence for processing units with associate cache requires the common connection to address/command bus 2.

Common address/command bus 2 provides the information resource for cache coherence, but does so at the expense of introducing electrical loading and associated clock frequency limiting. Conventional load buffering latches for clock synchronized computer systems introduce one or more clock delays in the transmission path, a clearly detractive design parameter for systems pursuing high performance with parallel architectures.

Figure 2:
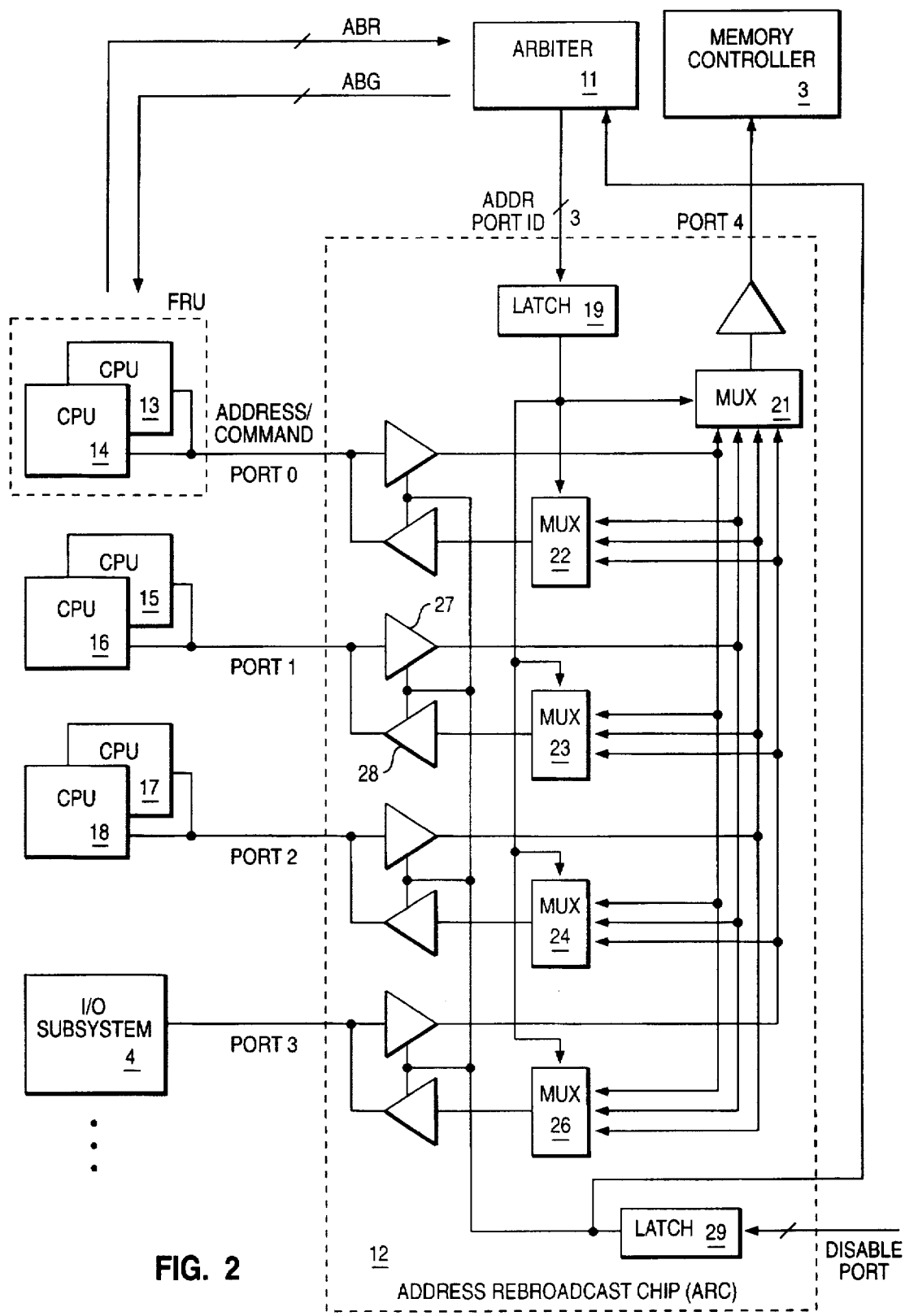
FIG. 2 is a schematic diagram of an address rebroadcast chip architected as an active logical bus.

The solution according to the present invention is the logical bus architecture shown in FIG. 2. The logical bus architecture as implemented through the address rebroadcast chip (ARC) minimizes delays by ensuring that clocked signals reach their destination within the same address tenure. For the present embodiments as illustrated by the waveforms in FIG. 3, the address tenure is 1 ½ clock cycles. Address signals propagate and stabilize within 1 ½ clock cycles at which time they are sampled by the bus snoopers (snooper refers to other CPUs, I/O hubs, memory controllers, etc which are monitoring the address bus). Then there is a ½ clock cycle delay from the deactivation of the current master's address drivers and the activation of the elected master's drivers to avoid a driver overlap condition.

The logical bus architecture of FIG. 2 also provides resources for selectively disabling ports connecting individual processing units. This capability facilitates the isolation of processing units for fault testing, power conservation, or the like.

The embodiment depicted in FIG. 2 shows a multiplicity of central processing units (CPUs) 13–18 electrically connected through their address/command buses to respective input ports 0–2 of address rebroadcast chip 12. Memory controller 3 and I/O subsystem 4 are also connected via their address/command lines to ports 3 and 4 of address rebroadcast chip 12. Ports 0–4 are of widths comparable to the respective buses. Note that CPUs 13 and 14, which are illustrated as being commonly connected to the address/ command bus of port 0, are configured as a single board field replaceable unit (FRU) for purposes of computer system servicing.

Each CPU, the memory controller and the I/O subsystem depicted in FIG. 2 incorporate at least a single processing unit. The presence of processing units in memory controller 3 and I/O subsystem 4 is representative of advanced multiple processor computer systems, where such resources have bus master capability.

Address rebroadcast chip 12 serves as a logical equivalent to an extended physical address/command bus, accomplishing that function without the electrical loading effects which degrade the physical bus and its maximum operating frequency. Viewed otherwise with respect to FIG. 1, address rebroadcast chip 12 replaces address/command bus 2 while providing the functions of the physical bus.

The functional equivalence of the address/command bus provided by address rebroadcast chip 12 is accomplished through a judicious use of system level information generated in arbiter 11. Arbiter 11 determines the bus master, namely, the system resource, whether that be a CPU processing unit, a memory controller processing unit, or an I/O subsystem processing unit, which is to have exclusive access of the address/command and data buses during one or more of the next succeeding clock cycles. As embodied in FIG. 2, address rebroadcast chip 12 receives the bus master identification information and stores it in latch 19 as soon as arbiter 11 determines the bus master for the next address/ command bus transmission sequence. Since the arbitration is resolved before the address/command bus signals are transmitted, that information is used within address rebroadcast chip 12 to configure the signal paths between ports before the address signals are transmitted. Therefore, when the signals transmitted during the next succeeding clock cycle they are received and rebroadcast immediately.

For the embodiment depicted in FIG. 2, address rebroadcast chip 12 uses the bus master data derived by arbiter 11 and stored in latch 19 to set multiplexers 21, 22, 23, 24, and 26 to either receive or rebroadcast address/command information, based upon the specified bus master. For example, if arbiter 11 receives an arbitration request signal ABR from the processing unit in CPU 16 requesting access to the bus, and access is available, arbiter 11 returns an arbitration grant signal ABG to CPU 16 and simultaneously transmits to latch 19 the identification of port 1 as the port having the next successive bus master. When CPU 16 drives the address/command lines connected to port 1 of address rebroadcast chip 12, multiplexers 21, 22, 24 and 26 have already been configured to rebroadcast that information to respective ports 0, 2, 3 and 4. Bus loading effects on CPU 16 are eliminated since the CPU load only sees CPU 15 and port 1, with the signals at ports 0, 2, 3 and 4 being supplied by drivers in address rebroadcast chip 12. The receipt and rebroadcast of the address/command signals emanating from CPU 16 are accomplished within a single address tenure interval. From the perspective of the bus slave resources, whether they be a CPU, a memory controller, an I/O subsystem, or any other resource connected to the address/command bus through a port of address rebroadcast chip 12, the signals are logically identical to those that would have been received directly off a physical address/command bus.

As noted earlier, the sharing of a port by two CPUs such as 13 and 14 merely illustrates a field replaceable unit (FRU) preference. Namely, each port could be connected to a single resource if this was needed to meet the clock frequency requirements of the multiple processor system.

Another benefit of the logical bus architecture to which the present invention pertains, involves the capability to easily and selectively isolate resources by port. For the embodying address rebroadcast chip 12, this is accomplished by selectively disabling the bidirectional port amplifiers, such as receiver 27 and driver 28 for port 1, based upon the resource identification entered into latch 29. The identification of the isolated or disabled resource is also conveyed to arbiter 11. The ability to selectively isolate processing units in a multiple processor computer architecture is particularly valuable when that isolation can be accomplished at the level of a field replaceable unit (FRU). This allows the malfunction investigation to be performed with relative ease and at a level consistent with field servicing of the computer system.

Figure 3:
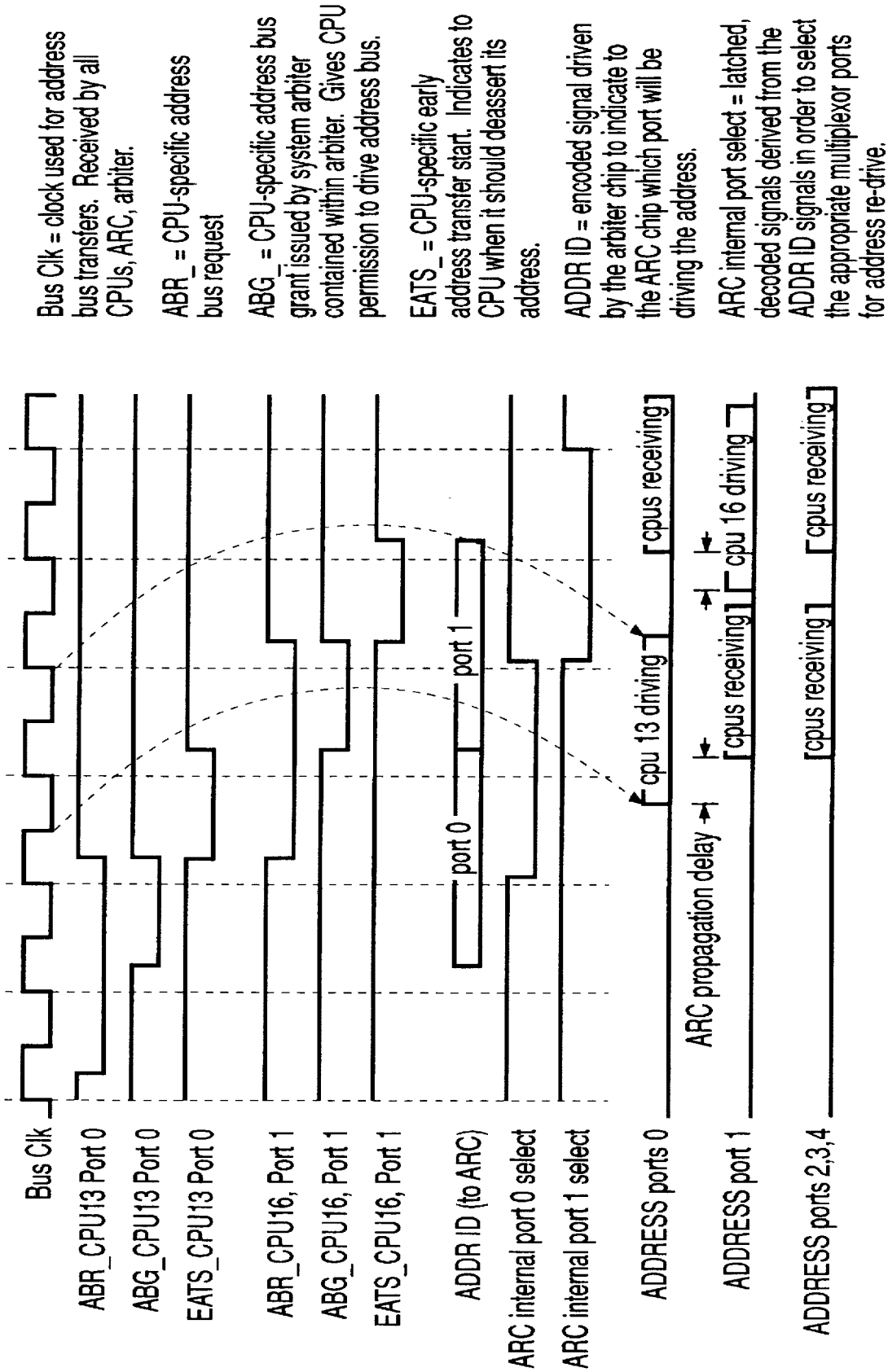
FIG. 3 depicts a variety of waveforms as might appear in the use of a particular version of the computer system in FIG. 2.

FIG. 3 illustrates a sequence of waveforms as might appear in the embodying logical bus of in FIG. 2. The bus clock signal is shown at the top. The next three waveforms represent signals associated with CPU 13 as connected to port 0 (FIG. 2), where the first represents an arbitration request signal, the second represents the arbitration grant signal, and the third represents the early address transfer start signal associated with CPU 13. The next succession of three waveforms represent a successively later request by CPU 16 as connected to port 1 (FIG. 2), followed in succession with the arbitration grant and the early address transfer start signals. Note that the address identification ADDR ID is generated by arbiter 11 (FIG. 2) and provided consistent with the grant signal. For the example depicted, also note that the IDs specify as bus masters the resources on port 0 and port 1 for corresponding CPU 13 and CPU 16 grants.

The next group of waveforms depict operations internal to the address rebroadcast chip, which operations are also clock synchronized and responsive to the address ID latched from the arbiter. The modes of operation of ports 0, 1, 2, 3 and 4 are set forth in the next three waveforms. Note that consistent with the arbitration results, by which CPU 13 and then CPU 16 are successively the bus masters, port 0 first receives address signals from CPU 13 and rebroadcasts ports 1, 2, 3 and 4 for external distribution to attached port resources. In the next address tenure ports 0, 2, 3 and 4 with the rebroadcast signal. FIG. 3 also schematically depicts a gate propagation delay for address rebroadcast chip 12.

The features of the present invention provide a multiple processor computer system with a logical bus architecture which functionally replicates the conventional address/command bus while obviating the loading problems associated with a physical bus. Furthermore, the logical bus architecture is directly amenable to refinements which allow for the selective isolation of processors or other resources connected to the address/command bus for purposes of fault investigation or the like. Since the logical bus as implemented by the address rebroadcast chip utilizes arbiter information as to the bus master, time delays associated with the logical bus are merely gate propagation intervals, not full clock cycles.

Though the invention has been described and illustrated by way of a specific embodiment, the systems and methods encompassed by the invention should be interpreted to be in keeping with the breadth of the claims set forth hereinafter. For example, though the embodiment is in the context of an address/command bus logical equivalent, the concepts are applicable to shared bus architectures with multiple processor and bus master operation.

We claim:

1. An address rebroadcast apparatus for interconnecting multiple processing units, comprising:
    multiple bidirectional ports individually connected to address lines of the multiple processing units and a memory system;
    means for receiving information from an arbiter identifying a master of the multiple processing units; and
    means for interconnecting enabling connection of the bidirectional ports to receive an address from address lines of the identified master processing unit and to rebroadcast such received address through the bidirectional ports other than the port connected to the identified master processing unit.

2. The apparatus recited in claim 1, wherein the means for enabling connecting uses multiplexers.

3. The apparatus recited in claim 1, further comprising:
    means for selectively disabling a port to isolate the address lines of a first processing unit responsive to a detection of an error in an operation of the first processing unit.

4. The apparatus recited in claim 2, wherein the means for enabling connection includes bidirectional ports capable of receiving and rebroadcasting addresses on address lines connected to the ports, the bidirectional port operations being in a direction derived from information provided by the arbiter.

5. The apparatus recited in claim 3, wherein the means for enabling connection includes bidirectional ports capable of receiving and rebroadcasting addresses on address lines connected to the ports, the bidirectional port operations being in a direction derived from information provided by the arbiter.

6. The apparatus recited in claim 4, wherein the information identifying the master processing unit enables the port connected to the address lines from the identified master processing unit to receive addresses, and enables ports other than the port connected to the master processing unit to rebroadcast addresses received over the address lines from the master processing unit.

7. The apparatus recited in claim 5, wherein the information identifying the master processing unit enables the port connected to the address lines from the identified master processing unit to receive addresses, and enables ports other than the port connected to the master processing unit to rebroadcast addresses received over the address lines from the master processing unit.

8. In a system having multiple data processing units and a memory, a method of operating a logical bus to communicate addresses among the multiple data processing units and memory, comprising the steps of:
    receiving as an input to the logical bus information from an arbiter identifying one of the multiple processing units as a master processing unit;
    establishing in a port of the logical bus connected to the identified master processing unit a mode of operation under which the logical bus receives addresses from the identified master processing unit;

establishing in ports of the logical bus other than the port connected to the master processing unit a mode of operation under which addresses received through the master the master processing unit port are rebroadcast; and receiving addresses from the master processing unit through the port connected to the master processing through the port unit and connected to the master processing unit rebroadcasting the received addresses substantially simultaneously through ports other than the port connected to the master processing unit.

9. The method recited in claim 8, wherein the addresses rebroadcast are selected by multiplexers.

10. The method recited in claim 8, further comprising the step of:

selectively disabling a first port of the logical bus responsive to a detection of an error in an operation of the processing unit connected to the first port.

11. The method recited in claim 9, further comprising the step of:

receiving as an input to the logical bus information from the arbiter identifying a new master processing unit.

12. The method recited in claim 10, further comprising the step of:

receiving as an input to the logical bus arbitration data identifying a new master processing unit.

* * * * *

UNITED STATES PATENT AND TRADEMARK OFFICE
CERTIFICATE OF CORRECTION

PATENT NO. : 5,754,865
DATED : May 19, 1998
INVENTOR(S) : Itskin

It is certified that error appears in the above-identified patent and that said Letters Patent is hereby corrected as shown below:

Column 6, line 20: delete "interconnecting".
Column 7, line 6: delete "the master".
Column 7, line 10: delete "through the port".
Column 7, line 10: delete "connected to the master".
Column 7, line 11 delete "processing unit".

Signed and Sealed this

Second Day of March, 1999

Attest:

Q. TODD DICKINSON

Attesting Officer

Acting Commissioner of Patents and Trademarks